US007982701B2

United States Patent
Tsai et al.

(10) Patent No.: US 7,982,701 B2
(45) Date of Patent: Jul. 19, 2011

(54) ANALOG FRONT END DEVICE WITH TEMPERATURE COMPENSATION

(75) Inventors: Jui-Yuan Tsai, Tai Nan (TW); Szu-Ping Chen, Chu Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1010 days.

(21) Appl. No.: 11/822,363

(22) Filed: Jul. 5, 2007

(65) Prior Publication Data

US 2008/0008267 A1    Jan. 10, 2008

(30) Foreign Application Priority Data

Jul. 7, 2006   (TW) ............................. 95124742 A

(51) Int. Cl.
*G09G 3/36*   (2006.01)
(52) U.S. Cl. .......................................... 345/87; 375/319
(58) Field of Classification Search ............ 345/87–102; 375/319
See application file for complete search history.

(56) References Cited

U.S. PATENT DOCUMENTS

| 5,818,538 | A * | 10/1998 | Kim ............... 348/525 |
| 6,115,021 | A * | 9/2000 | Nonomura et al. ......... 345/101 |
| 6,333,728 | B1 * | 12/2001 | Libsch et al. .............. 345/90 |
| 6,463,266 | B1 * | 10/2002 | Shohara ..................... 455/196.1 |
| 2005/0099549 | A1 | 5/2005 | Chen et al. |
| 2005/0208909 | A1 * | 9/2005 | Maya et al. ................. 455/127.1 |

FOREIGN PATENT DOCUMENTS

| TW | 521239 | 2/2003 |
| TW | I230370 | 4/2005 |

OTHER PUBLICATIONS

110 MSPS/140 MSPS Analog Interface for Flat Panel Displays, AD9883A, Analog Devices, Inc., 2001 pp. 1-24.

* cited by examiner

*Primary Examiner* — Kevin M Nguyen
*Assistant Examiner* — Kenneth B Lee, Jr.
(74) *Attorney, Agent, or Firm* — Muncy, Geissler, Olds & Lowe, PLLC

(57) ABSTRACT

An analog front end device with temperature compensation is provided. The analog front end device comprises a bandgap voltage reference circuit, a clock generator, a temperature compensation circuit, one to three identical converting circuits and a Sync-on-Green circuit. The temperature compensation circuit is adapted to sense the temperature variations of the analog front end device and dynamically compensate the bandgap voltage reference circuit, the clock generator and the Sync-on-Green circuit as the temperature varies, which thereby controls the thermal drift in the analog front end device.

18 Claims, 5 Drawing Sheets

| | | | |
|---|---|---|---|
| T = 40°C | N'phase = Nphase − 2 | ADC = 0.9 V | I = 25 mA |
| T = 45°C | N'phase = Nphase − 1 | ADC = 0.96 V | I = 28 mA |
| T = 50°C | Nphase | ADC = 1.0 V | I = 30 mA |
| T = 55°C | N'phase = Nphase + 1 | ADC = 1.03 V | I = 32 mA |
| T = 60°C | N'phase = Nphase + 2 | ADC = 1.1 V | I = 35 mA |

ANALOG FRONT END DEVICE WITH TEMPERATURE COMPENSATION

BACKGROUND OF THE INVENTION

1. Field of the Invention

The invention relates to an analog front end (AFE) device with temperature compensation so as to solve a thermal drift due to temperature variation.

2. Description of the Related Art

Traditionally, AFE devices are being applied to two categories of display systems. First, an AFE device applied to a liquid crystal display (LCD) controller without a decoder is used to receive three analog image signals R, G, B from a VGA card of a computer system. Second, an AFE device applied to a video decoder is used to receive a signal from a tuner or a DVD player. Wherein, the signal includes three kinds of video signals as follows. The first is a composite video signal, often called a CVBS signal, which combines the luminance (Y) and chrominance (C) signals into a single channel. The second is a separate video signal separating the luminance (Y) and the chrominance (C) signals. The third is a component video signal which is split into three separate signals Y, Pr, Pb.

FIG. 1 shows a block diagram of a conventional AFE device. An AFE device 100 comprises a bandgap voltage reference circuit 130, a clock generator 140 and one to three identical converting circuits 150. Each converting circuit 150 further comprises a clamper (101, 111, 121), an input buffer (102, 112, 122) and an analog to digital converter (ADC) (103, 113, 123). Take the AFE device in the LCD controller, for example—three converting circuits 150 are required to convert three analog image signals R, G, B into three digital signals D1, D2, D3, respectively. Each converting circuit 150 uses the clamper (101, 111, 121) to calibrate the DC level of the respective analog image signal, then uses the input buffer (102, 112, 122) to buffer the respective analog image signal and finally supplies the respective analog image signal to the ADC (103, 113, 123). The clock generator 140 receives either a horizontal sync (HS) signal or a vertical sync (VS) signal to provide a periodic clock signal to the ADCs (103, 113, 123) for sampling. A reference voltage $V_{ref}$ generated by the bandgap voltage reference circuit 130, is provided to either the input buffer (102, 112, 122) for making modifications to both a gain and an offset voltage or the ADC (103, 113, 123) for making modifications to a full-scale voltage or a bias current.

In general, the interior of an integrated circuit is divided into a digital circuit and an analog circuit. Normally, there is no thermal drift in the digital circuit. By contrast, the thermal drift could occur in the analog circuit. For example, its voltage varies according to the temperature and its frequency also varies according to the temperature. In applications of display system controllers (including the LCD controllers and the video decoders as mentioned above), users would like the display system to have the same characteristic both at start-up (at a lower temperature) and after warm-up (at a higher temperature), e.g., a consistent display color and a consistent optimum sampling phase of the ADC (103, 113, 123). In other words, it implies that the thermal drift is not allowed to occur in the clampers (101, 111, 121), the ADCs (103, 113, 123), the clock generator 140 and related circuits (e.g., the Sync-on-Green circuit).

Conventional analog circuit designs make use of a variety of techniques, such as generating either a voltage or a current independent of the temperature, to eliminate the thermal drift in the clampers (101, 111, 121), the ADCs (103, 113, 123), the clock generator 140 and related circuits. However, these techniques have little effects on improving the thermal drift and waste hardware resources as well.

SUMMARY OF THE INVENTION

In view of the above-mentioned problems, an object of the invention is to provide an AFE device with temperature compensation in order to eliminate a thermal drift in a display system due to temperature variation.

In accordance with one embodiment, the AFE device with temperature compensation comprises a bandgap voltage reference circuit, a clock generator, a temperature compensation circuit and one to three identical converting circuits. Each converting circuit receives at least one analog image signal and generates at least one digital signal. Each converting circuit which further comprises a clamper, an input buffer and an ADC is adapted to convert the analog image signal into the digital signal. The temperature compensation circuit senses the temperature of the AFE device. As the temperature of the AFE device varies, the temperature compensation circuit provides at least one compensating signal to the AFE device so as to perform a dynamic compensation on the AFE device, thereby controlling the thermal drift in the AFE device.

According to a first embodiment of the invention, the temperature compensation circuit generates a first compensating signal and a second compensating signal to set related registers of the clock generator and the bandgap voltage reference circuit respectively, thus varying the optimum sampling phase, both the full-scale voltage and the bias current of the ADC and both a gain and an offset voltage of the input buffer. According to a second embodiment of the invention, responsive to a temperature variation of the AFE device, the temperature compensation circuit performs a dynamic compensation on the AFE device, e.g., the bandgap voltage reference circuit, the clock generator or the Sync-on-Green (SOG) circuit, so as to control the thermal drift in the AFE device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is an example of the temperature compensation table according to the first embodiment of the invention.

DETAILED DESCRIPTION OF THE INVENTION

The AFE device with temperature compensation of the invention will be described with reference to the accompanying drawings.

Figure 1:
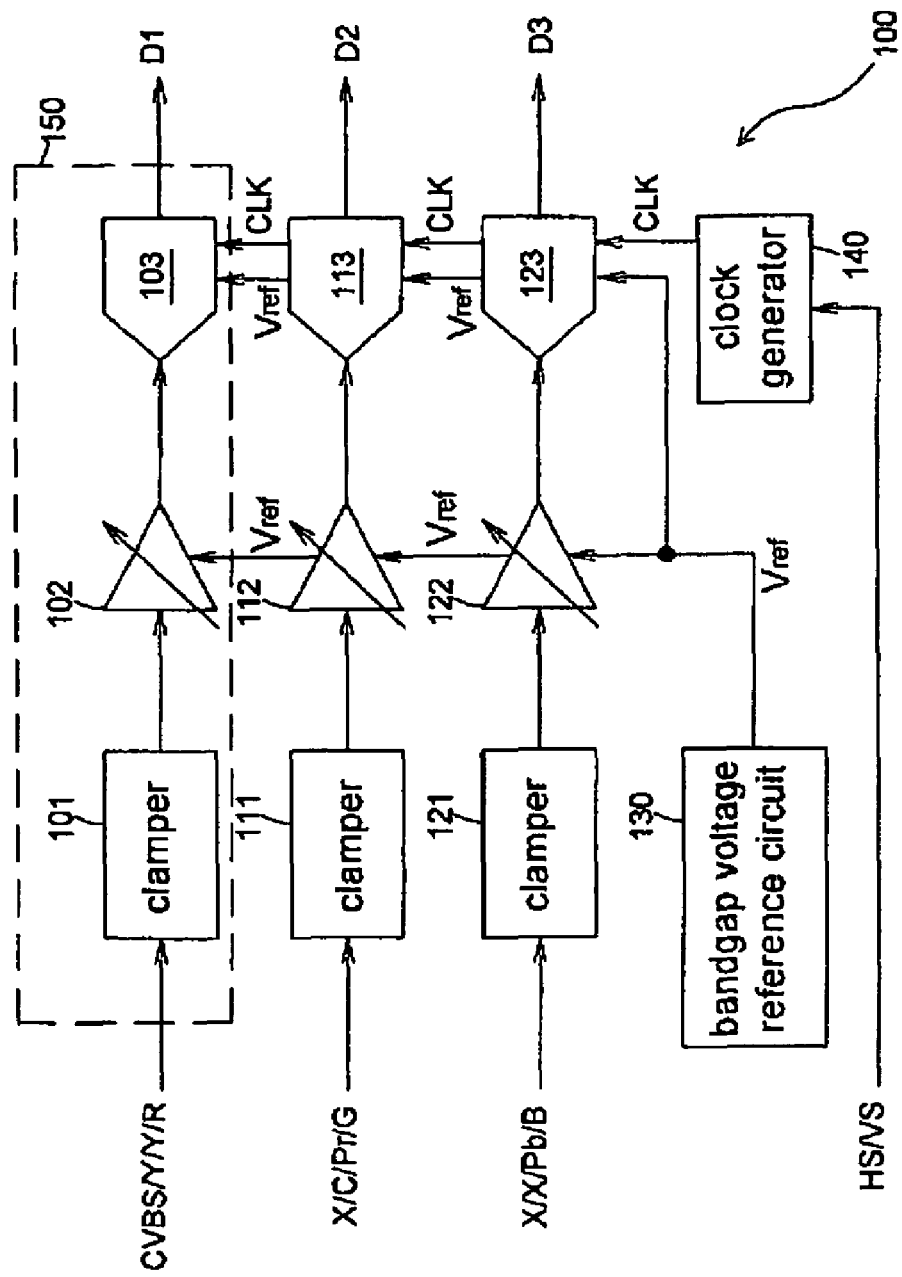
FIG. 1 shows a block diagram of a conventional AFE device.
Figure 2:
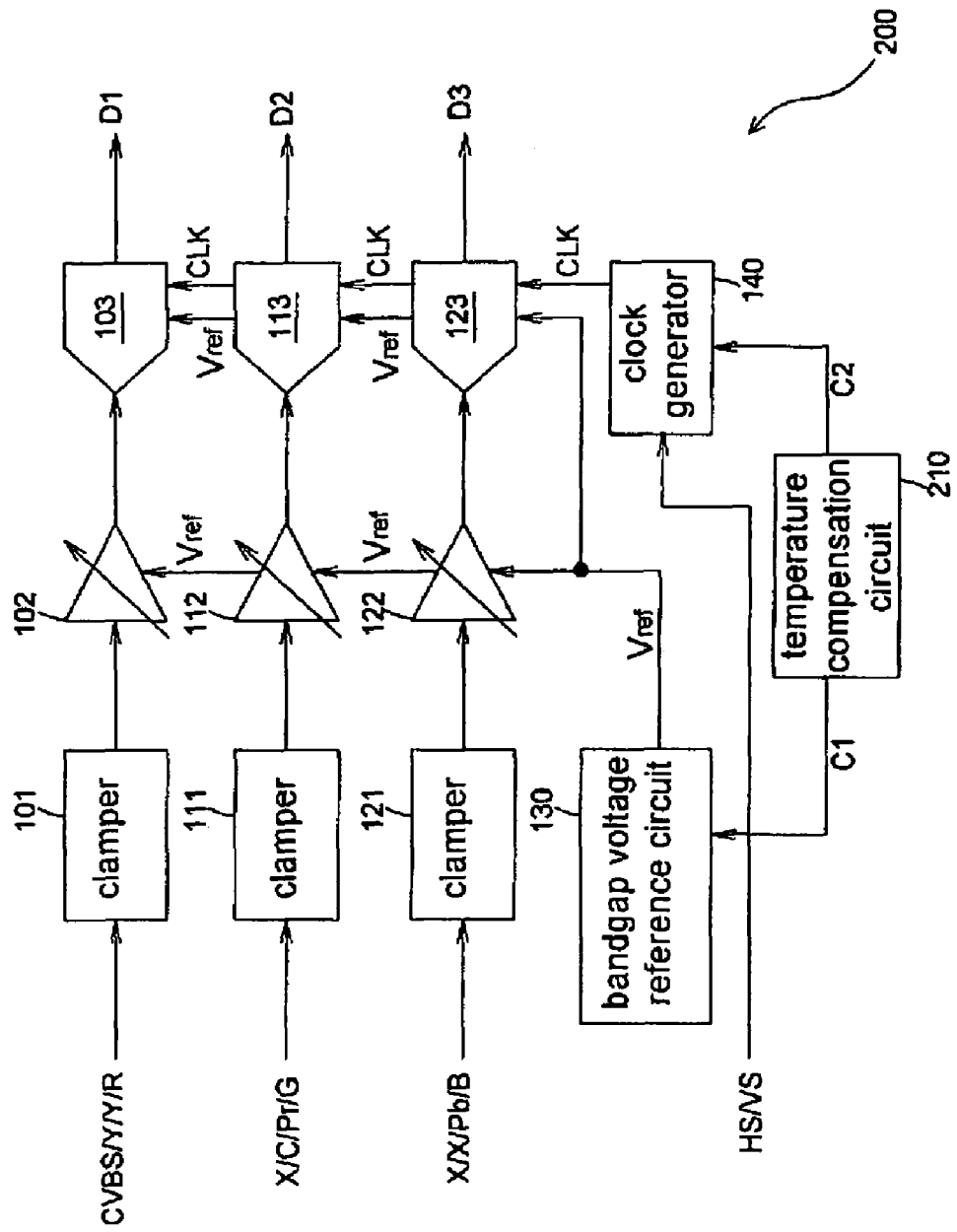
FIG. 2 shows a block diagram of an AFE device with temperature compensation according to a first embodiment of the invention.
Figure 3:
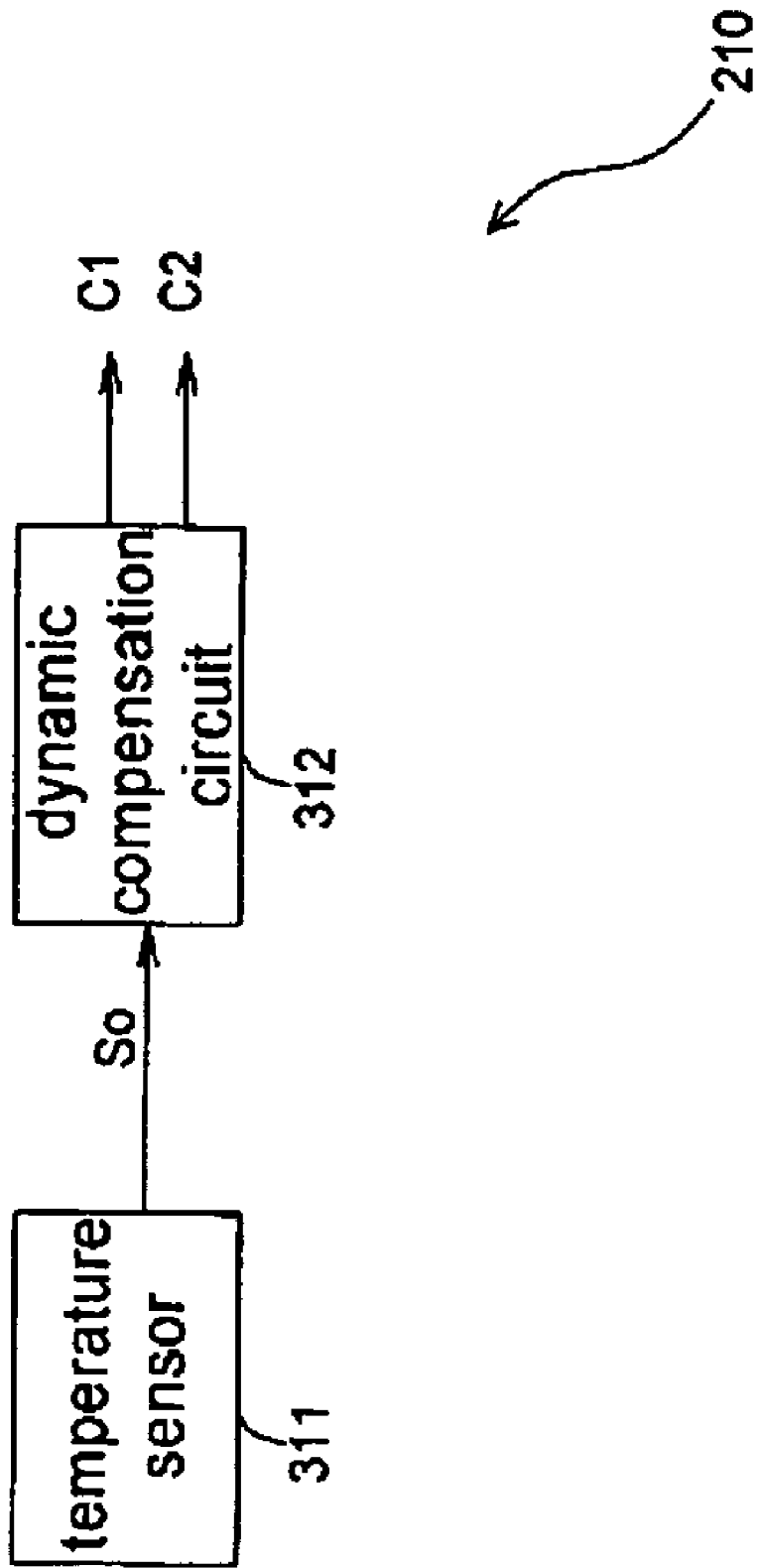
FIG. 3 shows a detailed block diagram of the temperature compensation circuit of FIG. 2.

FIG. 2 shows a block diagram of an AFE device with temperature compensation according to a first embodiment of the invention. The invention is disposed in a display system controller (including the LCD controllers and the video decoders as mentioned above). An AFE device with temperature compensation 200 comprises a temperature compensation circuit 210, a bandgap voltage reference circuit 130, a clock generator 140 and at least one converting circuit 150. The temperature compensation circuit 210 is adapted to sense the temperature of the AFE device 200. As the temperature of the AFE device 200 varies, the temperature compensation circuit 210 sends a first compensating signal C1 and a second compensating signal C2 to the bandgap voltage reference circuit 130 and the clock generator 140, respectively. Next, the bandgap voltage reference circuit 130 adjusts the reference voltage according to the first compensating signal C1 in order to avoid the thermal drift in the reference voltage due to the temperature change. Besides, the clock generator 140 adjusts the clock signal according to the second compensating signal C2 in order to avoid the thermal drift in the reference voltage due to the temperature change and thus obtain an optimum sampling phase. FIG. 3 shows a detailed block diagram of the temperature compensation circuit of FIG. 2. The temperature compensation circuit 210 comprises a temperature sensor 311 and a dynamic compensation circuit 312. The temperature sensor 311 is adapted to sense the temperature of the AFE device 200 and correspondingly generate a sensing-resultant signal $S_O$. With respect to the sensing-resultant signal $S_O$, the dynamic compensation circuit 312 performs a dynamic compensation and then generates the first compensating signal C1 and the second compensating signal C2.

In the first embodiment of the invention, the dynamic compensation circuit 312, implemented in firmware, can shortly retrieve corresponding parameters from a memory where a temperature compensation table 400 (shown in FIG. 4) is pre-stored by using a lookup table if the temperature varies. Note that the temperature compensation table 400 is illustrative only, as various changes and modifications thereof may be made without departing from the spirit of the invention. The temperature compensation table 400 includes four columns: (1) temperature, (2) optimum sampling phase, (3) full-scale voltage of the ADC and (4) bias current of the ADC. Suppose that a normal operating temperature of the AFE device is at 50° C. and the optimum sampling phase $N_{phase}$ of the ADC (103, 113, 123) is the 15$^{th}$ sampling phase (if there are totally 32 sampling phases for each level). In addition, a normal full-scale voltage of the ADC (103, 113, 123) is 1 volt and its bias current is typically 30 mA. The sensing-resultant signal $S_o$ reflects a temperature magnitude measured by the temperature sensor 311. While the temperature variation range of the AFE device 200 is within ±5° C., the temperature compensation of the dynamic compensation circuit 312 will not be launched. Instead, if the temperature of the AFE device 200 goes up more than 5° C. (e.g., at 60° C.), both the full-scale voltage and the bias current of the ADC (103, 113, 123) will be getting lower due to a worse characteristic of the ADC (103, 113, 123); furthermore, the optimum sampling phase $N_{phase}$ is shifted from the 15$^{th}$ sampling phase to the 13$^{th}$ sampling phase, rendering images of the display system unstable or fluctuating. At this moment, after receiving the sensing-resultant signal $S_O$, the dynamic compensation circuit 312 looks up corresponding parameters in the temperature compensation table 400 with respect to the current temperature (60° C.). The corresponding parameters include a new optimum sampling phase $N'_{phase}$ equal to the current optimum sampling phase $N_{phase}$ plus two and the full-scale voltage and the bias current of the ADC (103, 113, 123) respectively added up to 1.1V and 35 mA. Next, based on the obtained corresponding parameters, the dynamic compensation circuit 312 generates the second compensating signal C2 (to add two to the current optimum sampling phase $N_{phase}$) and the first compensating signal C1 (to respectively pull the full-scale voltage and the bias current of the ADC (103, 113, 123) up to 1.1V and 35 mA) to set related registers of the bandgap voltage reference circuit 130 and the clock generator 140. As such, what is expected is that the optimum sampling phase $N_{phase}$ is added back to the 15$^{th}$ sampling phase and that the ADC (103, 113, 123) is compensated for its worse characteristic, thus avoiding the thermal drift due to temperature changes.

It should be noted that the contents of the temperature compensation table 400 vary according to the elements that are expected to improve the thermal drift. As to the example given in FIG. 4, the elements that are expected to improve the thermal drift are the clock generator 140 and the ADC (103, 113, 123). If the element that is expected to improve the thermal drift is the input buffer 102, the dynamic compensation circuit 312 utilizes the first compensating signal C1 to set the related registers of the bandgap voltage reference circuit 130 so as to adjust or compensate the gain or the offset voltage of the input buffer (102, 112, 122). In addition, the dynamic compensation circuit 312 can also be implemented in hardware.

Figure 5:
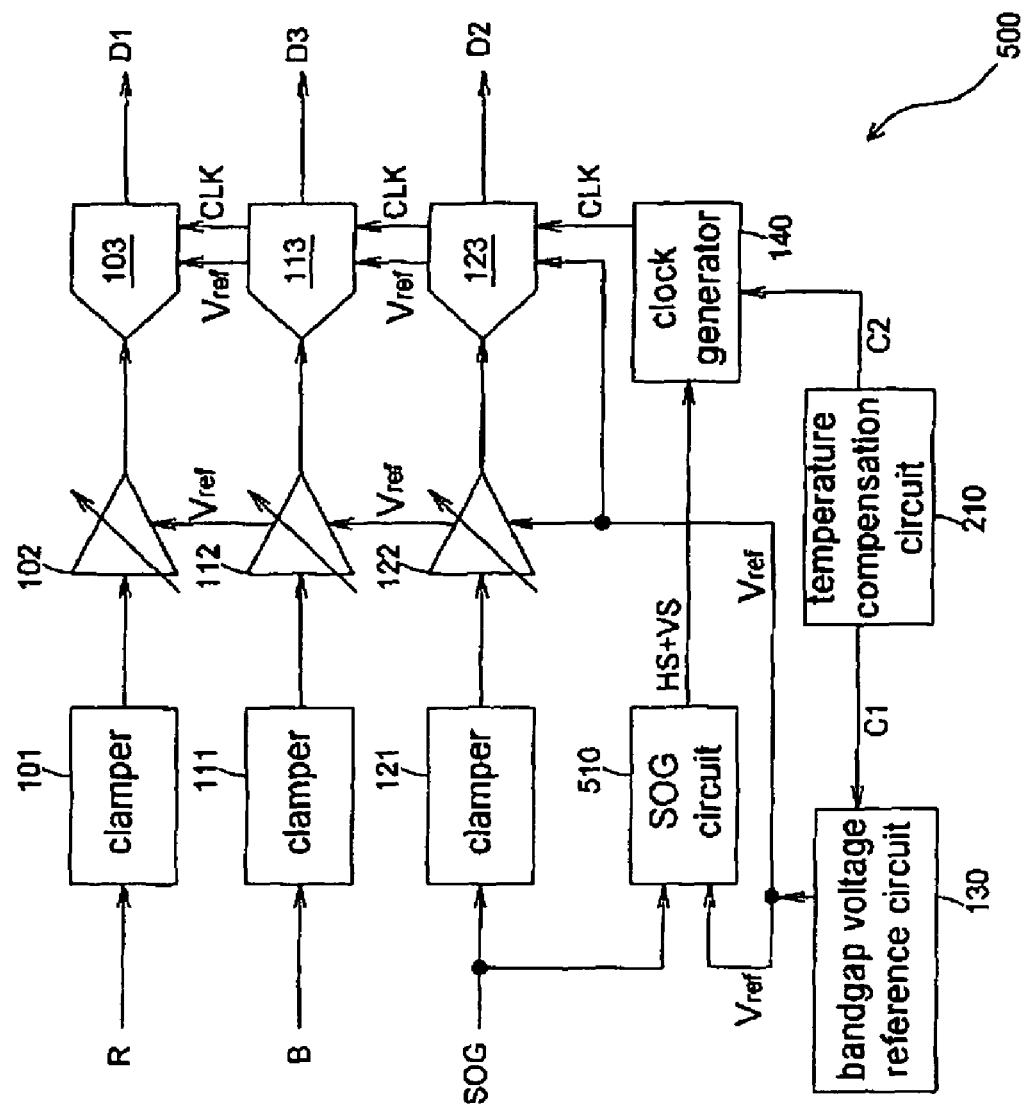
FIG. 5 shows a block diagram of an AFE device with temperature compensation according to a second embodiment of the invention.

As to general display system controllers, the thermal drift is most obvious in a LCD controller with a SOG circuit. While the thermal drift in the SOG circuit occurs, the DC level of the SOG circuit continuously moves up and down to cause the HS signal to vary. This may even result in a shifted optimum sampling phase or an unstable or fluctuating image. Therefore, the improving effect of the invention which is applied to the LCD controller with the SOG circuit is most remarkable. FIG. 5 shows a block diagram of an AFE device with temperature compensation according to a second embodiment of the invention. An AFE device with temperature compensation 500, which is disposed in a LCD controller, comprises a SOG circuit 510, a temperature compensation circuit 210, a bandgap voltage reference circuit 130, a clock generator 140 and three converting circuits 150. The three converting circuits 150 respectively receive and convert three analog signals R, G, SOG(=G+HS+VS) into three digital signals D1, D3, D2. Wherein, one of the three converting circuits 150 and the SOG circuit 510 simultaneously the receive the SOG signal; moreover, the SOG circuit 510 extracts a (HS+VS) signal from the SOG signal and then delivers the (HS+VS) signal to the clock generator 140 for further processing. The same numerals as used in FIG. 2 are used to designate the same elements and the description thereof is omitted. In this embodiment, the contents of the temperature compensation table 400 can be adjusted such that the dynamic compensation circuit 312 can utilize the first compensating signal C1 to set the related registers of the bandgap voltage reference circuit 130 so as to adjust or compensate the voltage of the SOG circuit 510, thereby solving or avoiding the thermal drift due to temperature changes.

Although the AFE device in the display system controller is taken as an example, the temperature compensation circuit of the invention is applicable to other analog application devices, such as amplifiers, ADCs, digital to analog converters, or voltage regulators. Analog circuits are used to process analog signals and require a more accurate reference voltage or a more accurate clock signal to stabilize the overall circuit. Therefore, it still falls within the scope of the invention to make use of the temperature compensation circuit for compensating the reference voltage or the accurate clock signal in order to minimize the thermal drift in the analog application devices.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An analog front end device, comprising:
   a reference voltage generator for generating a reference voltage;
   a clock generator for generating a clock signal;
   a clamper for adjusting a DC level of an analog signal to generate a second analog signal;
   a buffer for receiving the reference voltage and buffering the second analog signal to generate a buffering signal;
   an analog to digital converter receiving the reference voltage and the clock signal for converting the buffering signal into a digital signal; and
   a temperature compensation circuit for providing a compensating signal to at least one of the reference voltage generator and the clock generator;
   wherein the clock generator adjusts the clock signal responsive to the compensating signal; and
   wherein the reference voltage generator adjusts the reference voltage to compensate at least one of the buffer and the analog to digital converter when the compensating signal is provided to the reference voltage generator.

2. The analog front end device according to claim 1, wherein the clock generator receives either a horizontal sync signal or a vertical sync signal to generate the clock signal.

3. The analog front end device according to claim 1, which is disposed in a liquid crystal display controller.

4. The analog front end device according to claim 1, which is disposed in a video decoder.

5. The analog front end device according to claim 1, wherein the compensating signal further comprises a first compensating signal and a second compensating signal, and wherein the reference voltage generator adjusts the reference voltage according to the first compensating signal and the clock generator adjusts the clock signal according to the second compensating signal.

6. The analog front end device according to claim 1, wherein the temperature compensation circuit comprises:
   a temperature sensor for sensing a temperature to generate a sensing signal; and
   a dynamic compensation circuit for generating the compensating signal according to the sensing signal.

7. The analog front end device according to claim 6, wherein the dynamic compensation circuit is implemented in either firmware or hardware by using a lookup table.

8. The analog front end device according to claim 6, wherein the compensating signal sets the reference voltage generator to adjust a full-scale voltage of the analog to digital converter when the temperature varies over a threshold value.

9. The analog front end device according to claim 6, wherein the compensating signal sets the reference voltage generator to adjust a bias current of the analog to digital converter when the temperature varies over a threshold value.

10. The analog front end device according to claim 6, wherein the compensating signal sets the reference voltage generator to adjust either a gain or an offset voltage of the buffer when the temperature varies over a threshold value.

11. The analog front end device according to claim 6, wherein the compensating signal sets the clock generator to adjust a sampling phase of the analog to digital converter when the temperature varies over a threshold value.

12. The analog front end device according to claim 6, comprising:
    a Sync-on-Green circuit, receiving a Sync-on-Green analog signal, for extracting a sync signal to generate a horizontal sync signal and a vertical sync signal.

13. The analog front end device according to claim 12, wherein the compensating signal sets the reference voltage generator to adjust a voltage of the Sync-on-Green circuit when the temperature varies over a threshold value.

14. An analog application device, comprising:
    a reference voltage generator for generating a reference voltage;
    a clock generator for generating a clock signal;
    an analog circuit receiving at least one of the reference voltage and the clock signal for processing an analog signal to generate an output signal; and
    a temperature compensation circuit for generating a compensating signal to at least one of the reference voltage generator and the clock generator when a temperature in the analog application device varies over a threshold value;
    wherein the clock generator adjusts the clock signal responsive to the compensating signal; and
    wherein the reference voltage generator adjusts the reference voltage responsive to the compensating signal.

15. The analog application device according to claim 14, wherein the analog circuit comprises:
    a clamper for adjusting a DC level of an analog signal to generate a second analog signal;
    a buffer for buffering the second analog signal to generate a buffering signal; and
    an analog to digital converter receiving the reference voltage and the clock signal for converting the buffering signal into a digital signal.

16. The analog application device according to claim 14, wherein the temperature compensation circuit comprises:
    a temperature sensor for sensing the temperature in the analog application device to generate a sensing signal; and
    a dynamic compensation circuit for generating the compensating signal according to the sensing signal.

17. The analog application device according to claim 16, wherein the dynamic compensation circuit is implemented in either firmware or hardware by using a lookup table.

18. The analog application device according to claim 14, wherein the analog circuit is a voltage regulator.

* * * * *